W. REID.
THREE WIRE TELEPHONE SYSTEM.
APPLICATION FILED FEB. 26, 1906.
910,314.　　　　　　　　　　　　　Patented Jan. 19, 1909.
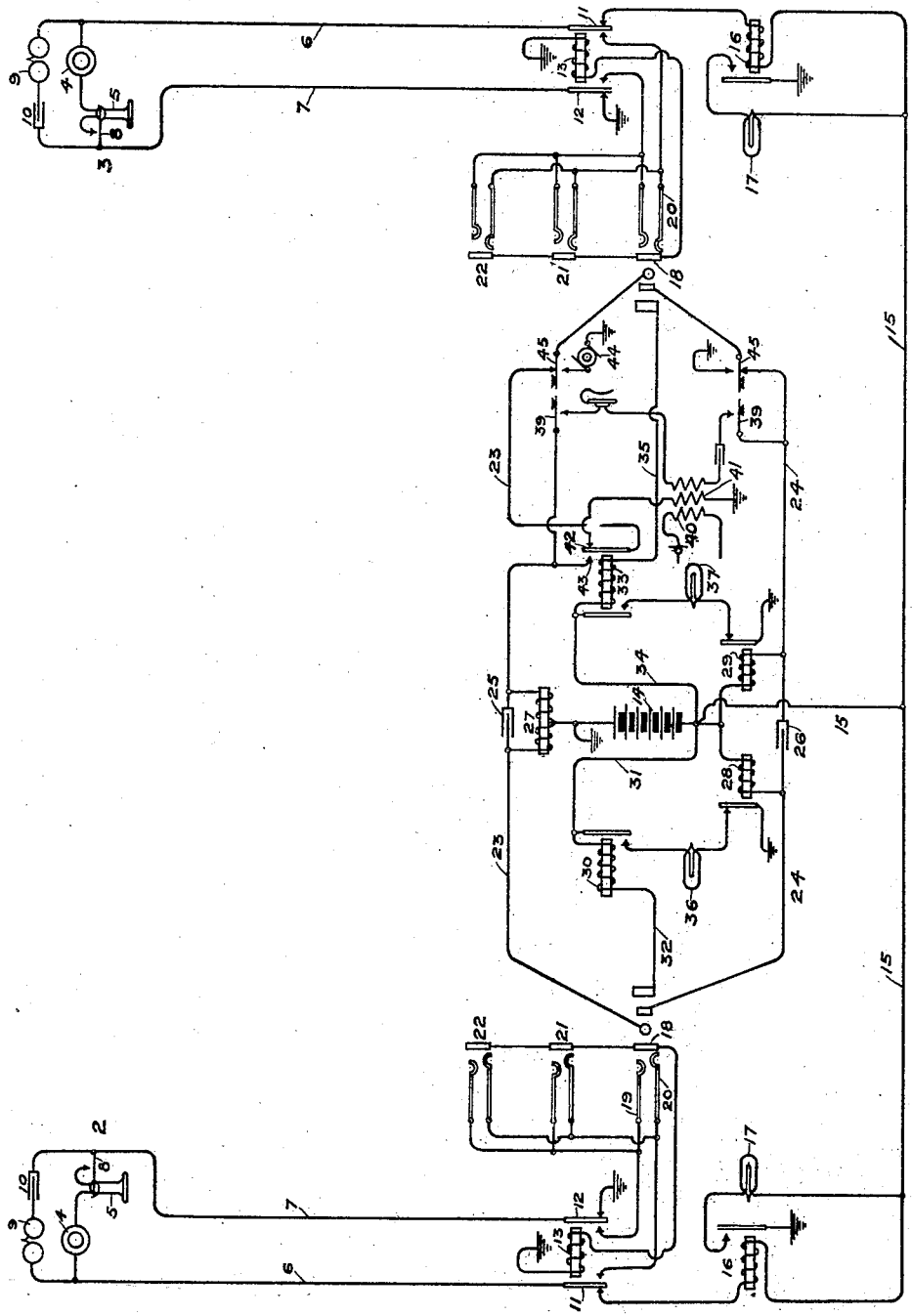
Witnesses
A. Dahl.
C. C. Bradbury
William Reid
Inventor
By Curtis B. Camp
Attorney

UNITED STATES PATENT OFFICE.

WILLIAM REID, OF CHICAGO, ILLINOIS, ASSIGNOR TO KELLOGG SWITCHBOARD & SUPPLY COMPANY, OF CHICAGO, ILLINOIS, A CORPORATION OF ILLINOIS.

THREE-WIRE TELEPHONE SYSTEM.

No. 910,314.  Specification of Letters Patent.  Patented Jan. 19, 1909.

Application filed February 26, 1906. Serial No. 302,843.

*To all whom it may concern:*

Be it known that I, WILLIAM REID, a citizen of the United States, residing in Chicago, county of Cook, and State of Illinois, have invented certain new and useful Improvements in Three-Wire Telephone Systems, of which the following is a specification.

My invention relates to central energy telephone systems, particularly of the three-wire type or those in which three contacts are provided upon the jacks and plugs, two of which are in the talking circuit, the third being used for signaling and testing purposes.

One of the objects of my invention is to provide a system of this class which shall be simple and inexpensive to install while furnishing the highest degree of efficiency in use, and one which shall have its talking circuit free from shunts or by-paths other than those necessary in furnishing the energy to the lines for conversation.

My invention is illustrated in the accompanying drawing in which the figure represents two subscribers' lines and connective means therefor at the central office, with the apparatus shown in its normal or unactuated condition.

In the drawing the subscribers' substations 2 and 3 are each provided with a transmitter 4 and receiver 5 in a bridge of the line conductors 6 and 7, said bridge being normally open at the switch hook 8 when the receiver is not in use. A suitable call bell or annunciator 9 and condenser 10 are connected in the permanent bridge of the line conductors. Any suitable common battery substation outfit may be used in lieu of that shown.

At the central office the line conductors terminate in levers or contact springs 11 and 12 of the cut-off relay 13. The contact spring 12 is normally connected to ground and the contact spring 11 is normally connected with the central office battery 14 by means of conductor 15 and the winding of the line relay 16. A line lamp or signal 17 is controlled through the normally-open contacts of the line relay in an obvious manner.

Each line is provided with an answering jack having a ring contact or testing terminal 18 which is connected to one side of the winding of cut-off relay 13, the other side of said winding being connected to ground. The tip contact spring 19 and the ring spring 20 of the answering jack are connected with the normally-open front contacts of the cut-off relay 13. Multiple jacks 21 and 22 are provided in any suitable number.

The operator's cord circuit consists of a tip strand 23 and a sleeve strand 24 extending between the corresponding contacts of the plugs. The tip strand is conductively separated but inductively united by a condenser 25, a condenser 26 being similarly disposed in the sleeve strand. The central office battery 14 is connected in a permanent bridge of the cord strands, a suitable impedance coil 27 being connected between the grounded side of the battery and the tip strand of the cord circuit upon either side of the condenser 25. The opposite pole of the battery is connected with the sleeve strand of the cord circuit upon either side of the condenser 26 through the windings of supervisory relays 28 and 29. A supervisory relay 30 is connected with the battery 14 by means of conductor 31 and with the third contact of the plug by means of conductor 32, a supervisory relay 33 being similarly connected upon the opposite side of the cord circuit by means of conductors 34 and 35. The supervisory lamp 36 is jointly controlled through the normally-open contacts of the supervisory relay 30 and the normally-closed contacts of the supervisory relay 28, and the supervisory lamp 37 is similarly controlled through the corresponding contacts of supervisory relays 33 and 29.

The head receiver, the secondary winding of the induction coil and a condenser are bridged across the strands of the cord circuit by a suitable listening key 39, and the primary winding 40, in series with a transmitter is shown adapted to be supplied with current from the battery 14 or any suitable source. A tertiary winding 41 of the operator's induction coil is normally connected between ground and the contact lever 42 of the supervisory relay 33, said lever being connected with the tip strand of the cord circuit, and being normally severed from said strand at the front contact anvil 43 of said relay. A suitable ringing generator 44 may be connected with the line by means of a ringing key 45 in the usual manner.

The operation of the system is as follows: The subscriber at station 2, desiring to signal the central office, removes his receiver from the hook, which closes a path for current from the central office battery 14 over conductor 15, the winding of the line relay 16, the conductors of the telephone line and the substation apparatus to ground at the normally-closed contact 12 of the cut-off relay 13. Current in this path operates the line relay which attracts its armature and lights the line signal 17. Noticing the signal, the operator inserts her answering plug in the jack of the calling line. Battery will then flow through the cut-off relay over conductor 31, supervisory relay 30, conductor 32, ring contact 18, through the winding of the cut-off relay to ground. The talking circuit is completed at the front normally-open contacts of the cut-off relay 13, due to current in this path, the energization of said relay also serving to remove the ground from the limb 7 of the telephone line at contact spring 12, and to remove the connection of limb 6 with the line relay at contact spring 11, whereby the line signal is effaced. The circuit of the supervisory lamp 36 is closed by the operation of the relay 30, but due to the fact that the subscriber's telephone is off its hook current flows through the supervisory relay 28, which opens the circuit of the lamp and prevents its illumination. The path for current through the relay 28 is over sleeve strand 24, the corresponding contact spring 20 of the jack, the limbs of the telephone line, jack spring 19, tip strand 23 and one winding of the impedance coil 27 to the battery. The operator may now communicate with the calling subscriber by throwing her listening key 39. The retardation of the windings of the coil 27 and the sleeve supervisory relays 28 and 29 is adapted to prevent the shunting of the voice currents through the battery, said voice currents being inductively propagated from one side of the cord circuit to the other through the condensers 25 and 26. Upon learning that the subscriber at station 3 is desired the operator tests the condition of said line by touching the tip of her plug to a testing terminal 18 of a multiple jack of that line. If a connection is established with the desired line at another section of the switchboard a potential above that of ground will exist upon the sleeve of the multiple jack tested, due to the flow of battery through said sleeve, as previously described, at the section where such connection exists. Upon testing the line, therefore, a flow of battery will result from the test ring of the jack over the tip strand of the cord circuit, normally-closed contact 42 of the supervisory relay 33, through the tertiary winding 41 of the operator's induction coil, to ground. This flow of current will vary the potential across the bridge containing the operator's head receiver, producing an inductive click therein, and notifying her that the line is busy.

If the line is not in use the testing terminal of the jacks will be connected to ground through the cut-off relay and no flow of current will result when the line is tested. Receiving no click in her receiver the operator will insert the plug in the jack of the desired line. Battery will then flow through the supervisory relay 33 and the cut-off relay 13 as previously described with reference to the other side of the cord circuit, the actuation of the cut-off relay connecting the limbs of the telephone line with the jack section thereof, and opening the circuit of the line relay to prevent the operation of the line signal; the operation of the supervisory relay 33 closing the circuit of the supervisory lamp 37, and uniting the normally severed tip strand of the cord circuit, at front contact 43. Due to the fact that the subscriber's telephone is upon its hook the supervisory relay 29 is not energized to open the circuit of said signal and the supervisory lamp 37 is lighted. The operator now throws her ringing key 45 to signal the subscriber, the ringing current flowing over the tip contacts of the plug and jack, line conductor 7, through the substation signaling apparatus, line conductor 6, the sleeve contacts of the jack and plug, and back to the generator through the sleeve contacts of the ringing key. Upon the response of the called subscriber current will flow through the supervisory relay 29 which will open the circuit of the supervisory lamp 37, retiring said signal and indicating that the subscriber has responded. The flow of current through the supervisory relay 29 is over both sides of the metallic line and both strands of the cord circuit, returning to the battery through one winding of the impedance coil 27 as previously described with reference to the other side of the cord circuit. It will be noted that during conversation there are no shunts or bridges associated with the talking circuit excepting those necessary for the supplying of energy to the substation transmitters. Either subscriber, by replacing his telephone upon the hook, will interrupt the flow of current through the supervisory relay 28 or 29, which is in the path of current to the substation, permitting the armature of said relay to drop back, closing the circuit of the corresponding supervisory signal. The signal is thus illuminated due to the fact that the circuits of the supervisory relays 30 and 33 are local to the central office, and not under the control of the subscribers, said relays operating to close the circuits of the supervisory lamps as long as the plugs remain inserted in the jacks. Upon the termination of the conversation the operator removes the plugs from the jacks of the lines, which restores all parts to normal condition.

What I claim as new and desire to secure by Letters Patent is:

1. In a telephone system, the combination with a pair of telephone lines, of a cord circuit for making connection therewith for conversation, a pair of terminals in the talking circuit of the line normally disconnected therefrom, a signaling apparatus normally connected therewith, a supervisory relay associated with the cord circuit, a third conductor isolated from the talking circuit, and means associated with said third conductor for disconnecting said signaling apparatus from the line and closing the circuit of said supervisory relay, and a signal having its circuit completed by the actuation of said supervisory relay, substantially as described.

2. In a telephone system, the combination with a pair of telephone lines, of a cord circuit for making connection therewith for conversation, a third conductor at the central office isolated from the talking circuit, a cut-off relay in said conductor, a pair of terminals in the talking circuit normally disconnected from the line at the front contacts of said relay, a signaling apparatus for the line, a supervisory signal associated with the cord circuit, a pair of supervisory relays for controlling the circuit of said signal, one energized over said third conductor, and the other over the telephone line, and means operative in making a connection with the line for completing the talking circuit through said terminals, and jointly controlling the circuit of said signal through the contacts of said supervisory relays, substantially as described.

3. In a telephone system, the combination with a pair of telephone lines, of a cord circuit for making connection therewith for conversation, a third conductor at the central office isolated from the talking circuit, a cut-off relay in said conductor, a pair of terminals in the talking circuit normally disconnected from the line at the front contacts of said relay, a signaling apparatus for the line, normally connected therewith at the back contacts of said relay, a supervisory signal associated with the cord circuit, a pair of supervisory relays for controlling the circuit of said signal, one energized over said third conductor, and the other over the telephone line, and means operative in making a connection with the line for completing the talking circuit through said terminals, and jointly controlling the circuit of said signal through the contacts of said supervisory relays, substantially as described.

4. In a telephone system, the combination with a pair of telephone lines, of a cord circuit for making connection therewith for conversation, a third conductor at the central office isolated from the talking circuit, a cut-off relay in said conductor associated with the line, a supervisory relay in said conductor associated with the cord circuit, a pair of terminals in the talking circuit normally disconnected from the line at the contacts of said cut-off relay, a central source of current, a supervisory signal, means operative in making connection with the line for completing the talking circuit through said terminals at the contacts of said cut-off relay, and closing the circuit of said signal at the contacts of said supervisory relay, and a second supervisory relay receiving current from the same side of said source adapted to open the circuit of said signal when the subscriber's telephone is in use, substantially as described.

5. In a telephone system, the combination with a pair of telephone lines, of a cord circuit for making connection therewith for conversation, a third conductor at the central office isolated from the talking circuit, a cut-off relay in said conductor associated with the line, a supervisory relay in said conductor associated with the cord circuit, a pair of terminals in the talking circuit normally disconnected from the line at the contacts of said cut-off relay, an impedance coil, a central source of current and a second supervisory relay in a bridge of the cord circuit, a supervisory signal, and means operative in making connection with the line for completing the talking circuit through said terminals at the contacts of said cut-off relay, both of said supervisory relays receiving current from the same side of said source, one of said relays being energized over said third conductor and being adapted to close the circuit of said signal, the other of said relays being energized over the telephone line and said impedance coil, and being adapted to open the circuit of said signal when the subscriber's telephone is in use, substantially as described.

6. In a telephone system, the combination with a pair of telephone lines, of a cord circuit for making connection therewith for conversation, a third conductor at the central office isolated from the talking circuit, a cut-off relay in said conductor associated with the line, a supervisory relay in said conductor associated with the cord circuit, a pair of terminals in the talking circuit normally disconnected from the line at the contacts of said cut-off relay, an impedance coil, a central source of current and a second supervisory relay in a bridge of the cord circuit, a supervisory signal, means operative in making connection with the line for completing the talking circuit through said terminals at the contacts of said cut-off relay, both of said supervisory relays receiving current from the same side of said source, one of said relays being energized over said third conductor and being adapted to close the circuit of said signal, the other of said relays being energized over the telephone line and said impedance coil, and being adapted to open the circuit of said signal when the subscriber's telephone is in use, a second impedance coil, and a second supervisory relay, said impedance coil and said supervisory relay being individual to the opposite side of the cord circuit and being in the bridge with said source, and a condenser in each strand of the cord circuit disposed between said impedance coils and said relays, substantially as described.

7. In a telephone system, the combination with a telephone line, a cord circuit to connect therewith for conversation, a cut-off relay for the line, and a supervisory relay for the cord circuit, a source of current and a third conductor, said relays being actuated by current over said third conductor when the cord is connected with the line, and a relay coil in a circuit independent of the coils of either of said first relays for furnishing transmitter current to one side of the telephone line and for preventing the passage of voice currents from the talking circuit, and an impedance coil for furnishing transmitter current to the other side of said telephone line and for preventing the passage of voice currents therefrom, substantially as described.

8. In a telephone system, the combination with a telephone line, of a cord circuit to connect therewith for conversation, said cord circuit and said line circuit each having three contacts adapted to coöperate when the cord is connected with the line, two of said contacts of the cord and line forming a portion of the talking circuit, the third contact of the cord and line being adapted when connected to complete a local circuit independent of the talking circuit, a cut-off relay for the line in said local circuit, and a supervisory relay for the cord in said local circuit, a supervisory signal displayed by the actuation of said supervisory relay, and a second relay in a bridge of the talking strands of the cord circuit adapted to be actuated to efface said signal when the cord is connected with a line closed at the substation, substantially as described.

9. In a telephone system, the combination with a connecting circuit having a pair of talking strands, of a central source of current, an impedance coil connected between one pole of said source and one of said talking strands, a supervisory relay connected between the other pole of said source and the other of said talking strands, a second supervisory relay, and means to actuate it over a path independent of the talking circuit, a supervisory signal displayed by the actuation of said latter relay, said signal being adapted to be effaced by the actuation of the former supervisory relay, substantially as described.

10. The combination with a telephone line, of an operator's cord circuit, a source of current, a relay and an impedance coil bridged between the talking strands of said cord circuit, a second relay for the cord circuit adapted to be actuated over a circuit independent of the talking circuit when the cord is connected with a line, said former relay being adapted to be actuated over the telephone line when the line is closed at the substation, and a supervisory signal controlled by the joint action of said relays, substantially as described.

11. In a telephone system, the combination with a telephone line, of a cord circuit adapted to be connected therewith for conversation, a source of current, an impedance coil and a relay bridged between the talking strands of said cord circuit, a cut-off relay for the line and a second relay for the cord circuit, said cut-off relay and said second relay for the cord circuit being adapted to be actuated over a circuit independent of the talking circuit when the cord is connected with the line, and a supervisory signal having its circuit controlled by the conjoint action of said cord relays, substantially as described.

12. In a telephone system, the combination with a three-conductor cord, of a source of current associated with said cord circuit, an impedance coil connected between said source and a talking strand of said cord circuit, a supervisory relay connected between the other pole of said source and the other talking strand of said cord circuit, and a second supervisory relay connected between a pole of said source and a third strand of said cord circuit, and a supervisory signal controlled by the conjoint action of said relays, substantially as described.

13. In a telephone system, the combination with a pair of telephone lines, each having talking contacts and a test contact at the central office, a cord circuit for connecting said lines for conversation having talking conductors to register with the talking conductors of the line, and a third conductor to register with the test contacts of the line when the cord is connected for use, a cut-off relay connected with the test contact of the line, and a supervisory relay connected with the third contact of the cord, said relays being actuated in series when the cord is connected with the line, a second relay associated with the cord circuit and adapted to be actuated over the telephone line when the cord is connected with a line closed at the substation, and a supervisory signal displayed by the actuation of one of said cord relays, and effaced by the actuation of both of said cord relays, substantially as described.

Signed by me at Chicago, county of Cook, and State of Illinois, in the presence of two witnesses.

WILLIAM REID.

Witnesses:
C. C. BRADBURY,
EDITH F. GRIER.